Aug. 9, 1966 E. W. O'HANLON 3,266,002
CRYOGENIC PROBE
Filed Dec. 7, 1962
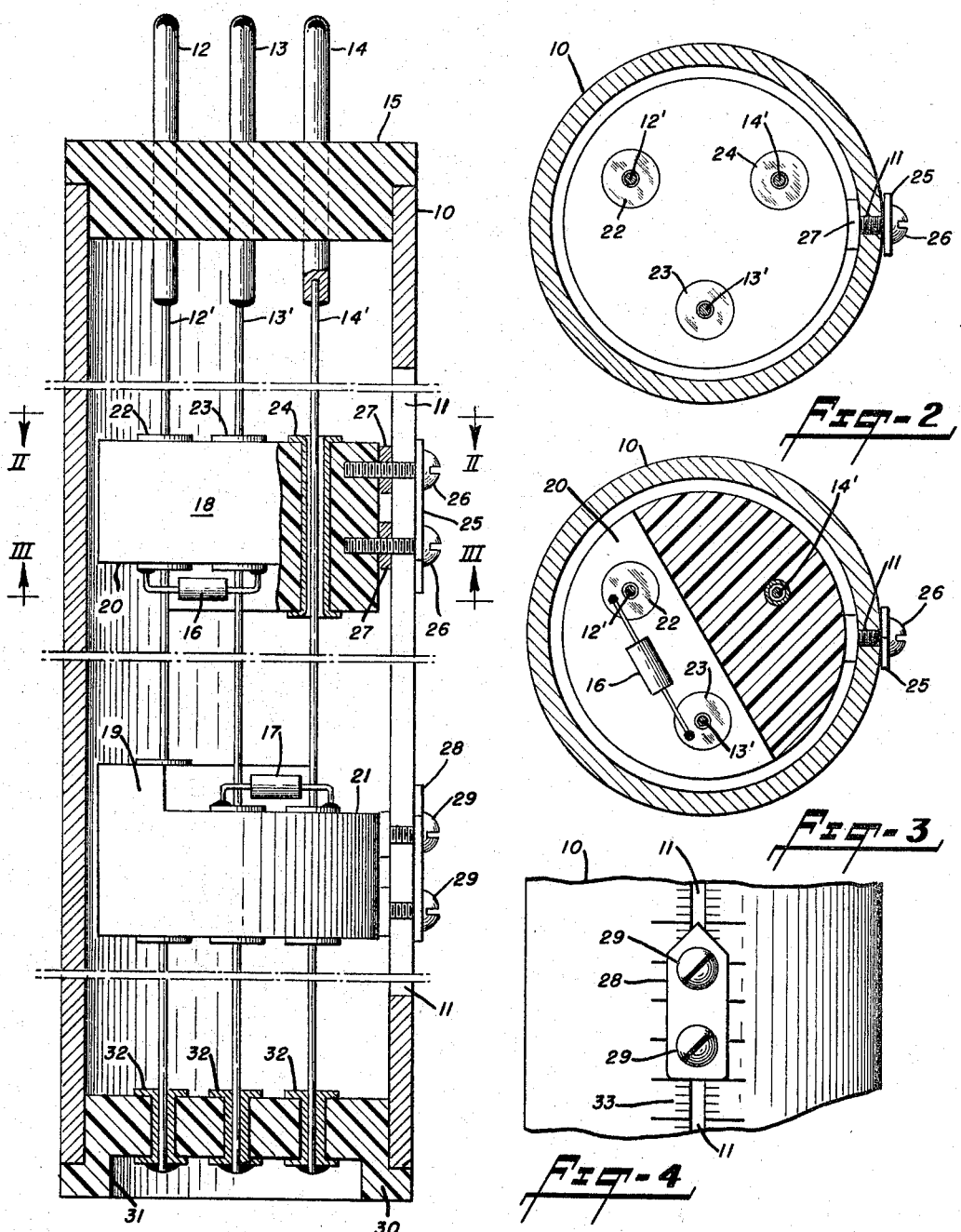
EDWARD W. O'HANLON
INVENTOR.
BY Rudolph J. Jurick
ATTORNEY

United States Patent Office 3,266,002
Patented August 9, 1966

3,266,002
CRYOGENIC PROBE
Edward W. O'Hanlon, Somerville, N.J., assignor to Malaker Laboratories, Inc., High Bridge, N.J., a corporation of New Jersey
Filed Dec. 7, 1962, Ser. No. 243,068
12 Claims. (Cl. 338—28)

This invention relates to a cryogenic probe and more particularly to a probe carrying adjustable sensing means for the measurement of the liquid level and/or the control of liquid level in the cryogenic temperature range.

Various sensing elements, such as carbon resistors, semi-conductors, etc., undergo a change in resistance when cycled from room temperature through cryogenic temperatures. Such resistance change causes an unbalance, or voltage change, in an appropriate electronic circuit which, in turn, actuates suitable read-out means providing an indication of the actual liquid level, or effects the operation of a suitable valve which results in the replacement of the boiled off liquid from a reservoir tank through a suitable transfer line.

Certain liquid level indicators and controllers presently available utilize a single sensing element mounted at the end of a rod, or tube, which is insertable into the liquid-containing tank or Dewar flask. In this way, the liquid level is measured, or controlled, at a single level which is fixed by the extent to which the rod is inserted into the tank. Such devices require an accurate measurement of the inside depth of the tank and, also, an accurate measurement of the insertion depth of the rod, or probe, which carries the sensing element.

Various other types of liqued level measuring and/or controlling arrangements utilize a probe having two sensing elements, particularly for controlling the level of the liquid at two distinct points. Such probes usually are constructed of concentric, telescopic tubes, or parallel, adjacently-disposed rods, with the sensing elements secured at various distances along the lengths of the tubes or rods. In such arrangements, the concentric tubes, or the parallel rods, have a length equal to the full depth of the liquid-containing tank, thereby to effect a measurement or control function for any specific level of the liquid within the tank. Consequently, if the level of the liquid is to be increased, the concentric tubes, or parallel rods must be extracted from the tank to the newly-required level of the liquid, thereby often resulting in as much of the tubes protruding from the tank top as is disposed within the tank. Clearly, such arrangements are impractical if the tank has a depth of 20 or 30 feet. Added to the undesirable protrusion of the tubes, or rods, from the tank, is the problem associated with the cable, or lead wires, for effecting electrical continuity between each sensing element and the associated external circuit for all possible positions of the sensing elements.

A probe made in accordance with this invention overcomes the limitations and shortcomings of prior arrangements. The device comprises a single tube having a fixed length of some six (6) inches longer than the total depth of the tank. A pair of sensing elements are contained within the tube and are slidably positionable along taut wires extending substantially the full length of the tube. The position of each sensing element is indicated on a calibrated scale carried by the outer surface of the tube and electrical connection to the individual sensing elements is effected through the taut wires, thereby eliminating the need for floating wires along the length of the tube.

An object of this invention is the provision of a probe for use in measuring and/or controlling the level of a cryogenic liquid.

An object of this invention is the provision of a cryogenic level probe having a sensing element which normally is slidably positionable within a tubular housing, and novel means effective at low temperatures to establish a positive electrical contact between the element and external connectors.

An object of this invention is the provision of a cryogenic level probe comprising a tubular housing, taut wires longitudinally disposed within the housing, a sensing element carried by a member normally slidably positionable along the wires, and means automatically effective at a low temperature to establish a positive electrical contact between the sensing element and the wires.

An object of this invention is the provision of a cryogenic probe comprising a tubular housing carrying spaced, taut wires, a pair of insulating sliders each carrying a sensing element and normally slidable along the wires, means for securing the sliders in fixed position at predetermined points along the housing when the sliders are at room temperature, and means automatically effecting a positive electrical connection between the sensing elements and the said wires when the said sliders are subjected to low temperatures.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose, to the claims appended hereto.

In the drawings wherein like reference characters denote like parts in the several views:

FIGURE 1 is a longitudinal, central, cross-sectional view of a cryogenic probe made in accordance with this invention, with certain internal parts shown in elevation and/or broken away;

FIGURE 2 is a transverse, cross-sectional view taken along the line II—II of FIGURE 1;

FIGURE 3 is a transverse, cross-sectional view taken along the line III—III of FIGURE 1; and FIGURE 4 is a fragmentary front view of the probe.

Referring, now, to the drawings, the probe housing comprises a tube 10, made of stainless steel, or other suitable metal having a high coefficient of thermal expansion. Such tube has a length exceeding the depth of the tank, or Dewar flask, containing the liquid to be measured or controlled, and a diameter such that the tube will fit through the entry hole at the top of the tank. In general, the tube is designed to rest upon the bottom of the tank with the upper portion of the tube extending vertically through an entrance hole provided at the top of the tank. It may here be pointed out that the drawings are not made to any particular scale and that the physical clearances between various component parts are exaggerated for purposes of illustration.

A longitudinal slot 11 is provided in the tube wall, starting at a point near or about 1 inch from the bottom and extending to a point about 3 inches from the top. Three connector pins 12, 13 and 14 are carried by an insulator plug 15, said pins being either molded into the plug or force-fitted into suitable holes provided for this purpose. These pins are spaced 120 degrees apart and serve as a means for connecting the probe elements to an extrenal circuit by means of a conventional pressure-type connector. Soldered to the individual connector pins are wires 12', 13' and 14', after which the plug 15 is cemented, or otherwise secured, in fixed position on the housing tube, with the wires passing through the tube. Suitable temperature sensing elements 16 and 17 are carried by the respective circular sliders 18 and 19 which are made of a suitable insulating material having a relatively low coefficient of thermal expansion. Each slider has three longitudinal holes formed therethrough (which holes correspond in angular orientation to the pins 12–14) and is milled to provide the respective recesses 20, 21 for accommodating the associated sensing elements.

Referring, specifically, to the slider 18, stainless steel sleeves 22, 23 and 24 are inserted through the longitudinal holes and the ends thereof are flared outwardly, as shown. The outside diameter of the stainless steel sleeves 22–24 is such that the sleeves fit snugly within the holes. Thus, when the sleeve ends are flared outwardly, there will be no lateral or axial movement of the sleeves relative to the slider. Further, at room temperature, the inside diameter of the sleeves 22–24 is slightly greater than that of the wires 12'–14', whereby the slider normally is free to slide along the wires. An indicator 25 is secured to the slider by means of two screws 26 which pass through the slot 11 and into threaded holes formed in the slider. Small washers 27 may be positioned between the slider and the housing tube 10. In actual practice, the clearance area between the slider and the inner wall of the tube 10 need be only a few thousandths of an inch and the spacing washers 27 generally are not required. The leads of the sensing element 16 are soldered to the flared ends of the sleeves 22 and 23.

The lower slider 19 is of similar construction but, preferably, is inverted so that the sensing elements 16 and 17 face each other.

In assembling the device, the top plug 15 is secured in position on the housing tube and the wires 12'–14' extend outwardly from the opposite end of the tube. The free ends of the wires 12'–14' are inserted through the stainless steel sleeves carried by the upper slider 18 and the slider is moved into the housing 10, after which the pointer 25 is secured thereto by the screws 26. The lower slider 19 then also is inserted over the wires 12'–14' and moved into the tube 10 after which the pointer 28 is secured thereto by the screws 29. At this point in the assembly of the device, the wires 12'–14' are relatively slidable through the sleeves of the sliders even though the sliders may be secured in fixed position relative to the housing tube 10.

A lower plug 30, made of a suitable insulating material, is provided with a central bore 31 and carries three hollow, copper rivets 32. The wires 12'–14' are inserted through the rivets and the plug 30 is cemented, or otherwise firmly secured, to the outer tube 10. Each of the wires 12'–14' now is drawn taut, and soldered to the associated copper rivet 32, after which the excess length of the wire is cut off.

It will now be apparent that the sliders, which carry the sensing elements, are slidably movable within the housing tube and along the taut wires by merely loosening the screws 26 or 29. The pointers 25 and 28 cooperate with a calibrated scale 33, whereby each sensing element can be set to a predetermined distance from the bottom of the probe and secured in such position by tightening the associated screws 26 or 29.

The taut wires 12'–14', which serve as guides for the sliding movement of the sliders 18 and 19, also serve as a means for effecting electrical connections between the individual sensing elements and the connector pins 12–14. These wires are selected such that their thermal coefficient of expansion is much less than that of the stainless steel sleeves carried by the sliders. The diameter of the wires is such that at room temperature there is a snug, sliding fit between each wire and the encircling sleeves. At cryogenic temperatures, however, the stainless steel sleeves contract more than the associated wire thereby forming the equivalent of a cold weld junction resulting in an excellent, positive electrical connection between the sleeves and the wires. Wires made out of alloys, such as manganin, constantan, advance etc., are satisfactory as such alloys have a low thermal coefficient of expansion and a substantially zero thermal coefficient of resistance. The specific thermal coefficient of resistance of the particular wire is not a critical factor as the particular sensing elements are selected such that their resistance change at cryogenic temperatures is far greater than that of the wire. Considerable latitude is permissible in the selection of the materials for the taut wires and the encircling sleeves, the only requirement being that the difference in the thermal coefficient of expansion of the particular wire and sleeve material be relatively large at cryogenic temperatures.

It will be noted that the sensing element 16, carried by the upper slider 18, is connected to the sleeves 22 and 23 slidable along the taut wires 12' and 13'. Similarly, the sensing element 17, carried by the lower slider 19, is connected to sleeves which are slidable along the wires 13' and 14'. Thus, at cryogenic temperatures, the sensing element 16 is connectable to the external circuit through the connection pins 12 and 13, whereas the sensing element 17 is connectable to the circuit through the pins 13 and 14. It will be apparent that the probe may be used with a conventional circuit to control the level of a liquid between two levels defined by the setting of the sliders with reference to the calibrated scale 33. The accuracy of the level control is determined merely by the positioning of the two sensing elements at predetermined settings measured from the bottom of the probe. Such settings may be varied throughout substantially the full length of the probe and positive electrical connections to the sensing elements are provided, at the operating temperature of the probe, without the use of conventional lead wires or cables.

Having now described the invention, those skilled in this art will be able to make various changes and modifications in the construction of the probe to meet specific conditions or applications. It is intended that changes and modifications of this character can be made without departing from the scope and spirit of the invention as recited in the following claims.

I claim:

1. A temperature-sensing probe comprising
  (a) a tubular housing,
  (b) a temperature-sensing element electrically connected to metal members and normally movable within said housing,
  (c) metal connection elements secured between opposite inner surfaces of said housing for connecting said sensing element to an external electrical circuit,
  (d) said connection elements and metal members being axially movable relative to each other and out of electrical contact with each other at normal temperatures and being mechanically locked together and in electrical connection with each other at cryogenic temperatures.

2. A temperature-sensing probe comprising,
  (a) a tubular housing,
  (b) longitudinally-extending electrically-conductive guide means within the housing and having ends secured to the corresponding ends thereof,
  (c) terminal means for connecting the guide means to an external electrical circuit,
  (d) an insulating slider within the housing and movable along the said guide means,
  (e) a temperature-sensing element carried by the slider, and
  (f) means including said guide means for establishing positive electrical continuity between the sensing element and said terminal means only when the probe is subjected to cryogenic temperatures.

3. A cryogenic probe comprising,
  (a) a tubular housing,
  (b) a plurality of laterally spaced taut wires in the housing and having ends secured to the corresponding ends thereof,
  (c) means for connecting the wires to an external electrical circuit,
  (d) an insulating member slidable on said wires, disposed within the housing and carrying a temperature sensing element, (e) means for setting the slider member on said wires at a preselected position within the housing at normal temperatures, and (f) means effective at cryogenic temperatures for establishing positive electrical continuity between the sensing element and the said wires.

4. The invention as recited in claim 3, wherein the said slider member includes metal sleeve members through which the said wires pass, the sensing element is connected to the said sleeve members, and wherein the size of the wires differs from that of the sleeve members and the thermal coefficient of the expansion of the sleeve members differs from that of the said wires such that at room temperature, the sleeve members are free to slide along the wires, while at cryogenic temperatures the sleeve members become mechanically secured to the wires, threby effecting the stated electrical continuity.

5. The invention as recited in claim 4, including a calibrated scale carried by the said housing, and indicating means carried by said slider member and movable along the said scale.

6. A cryogenic probe comprising,
 (a) a tubular housing,
 (b) a pair of insulator sliders disposed within the housing, each slider being provided with a plurality of longitudinal holes extending therethrough,
 (c) individual electrically conductive sleeve members disposed in the said holes of each slider,
 (d) a temperature-sensing element carried by each of said sliders, each sensing element being electrically connected to two sleeve members carried by the associated slider,
 (e) a plurality of taut, spaced wires extending longitudinally within the housing and having ends secured to the corresponding ends thereof, each wire passing through and in positive electrical contact with aligned sleeve members of the sliders at cyrogenic temperatures,
 (f) external electrical terminals connected to the said wires, and
 (g) adjustable means for securing the sliders at normal temperatures in fixed position relative to the housing at predetermined points.

7. The invention as recited in claim 6, wherein the said wires and the said sleeve members are made of materials having different thermal coefficients of expansion, and wherein the said sleeve members slidably encircle the associate wire at normal temperatures.

8. The invention as recited in claim 6, wherein the said sleeve members are made of a material having a substantially higher thermal coefficient of expansion than the said wires and wherein the thermal expansion coefficient of the said sleeve members and wires are so proportioned that at cryogenic temperatures the wires are tightly engaged by the associated sleeve members.

9. The invention as recited in claim 6, including a longitudinal slot extending from a point near the bottom to a point near the top of and formed in the housing wall, and wherein the said adjustable means comprises threaded members passing through the said slot into threaded holes formed in the sliders.

10. The invention as recited in claim 9, including a graduated scale carried by the housing, and an indicating pointer carried by each slider and movable along the said scale at normal temperatures.

11. A cryogenic probe comprising,
 (a) a tubular housing having a longitudinal slot extending from a point near the bottom to a point near the top of and formed in the wall thereof,
 (b) a pair of insulator sliders disposed within the housing, each slider being provided with three aligned holes extending longitudinally of said housing,
 (c) individual metal sleeve members disposed in the holes of each slider,
 (d) temperature-sensing elements carried by the sliders, each element being electrically connected to two sleeve members of the associated slider,
 (e) adjustable means extending through the said slot and into the sliders, said means being operable to position the sliders at predetermined fixed positions within the housing at normal temperatures,
 (f) longitudinal, taut wires extending through and in positive electrical contact at cryogenic temperatures with the aligned sleeve members carried by the sliders, said wires having ends secured to the corresponding ends of said housing and a lower thermal coefficient of expansion than the metal sleeve members, and a diameter such that at normal room temperature there is a snug, sliding fit between the wire and the encircling sleeve members, and
 (g) external connection terminals connected to the ends of said wires.

12. The invention as recited in claim 11, including a calibrated scale carried by the housing proximate to the said slot, and indicator members carried by the sliders and movable along the said scale.

References Cited by the Examiner
UNITED STATES PATENTS 3,001,052   9/1961   Swanson _____ 200—113.8

ANTHONY BARTIS, *Acting Primary Examiner.*

RICHARD M. WOOD, *Examiner.*

W. D. BROOKS, H. T. POWELL, *Assistant Examiners.*